Jan. 9, 1968
C. E. BRANDT ETAL
3,362,568
GASKET SEAL
Filed Dec. 27, 1965
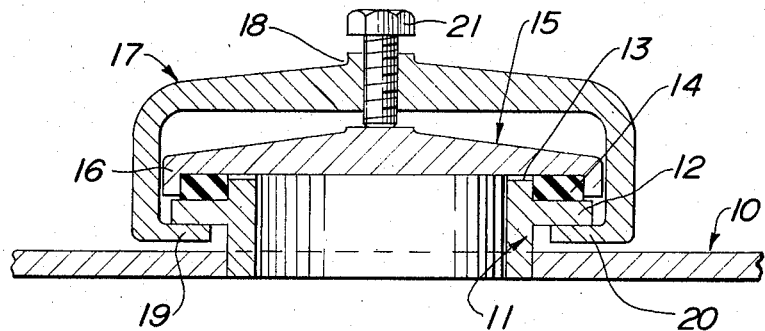
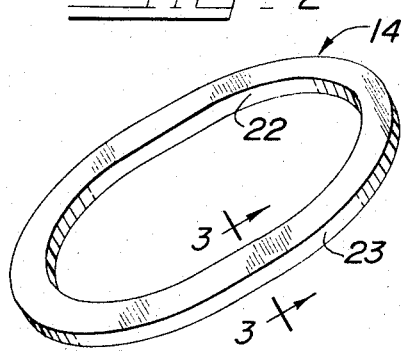
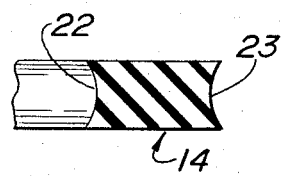
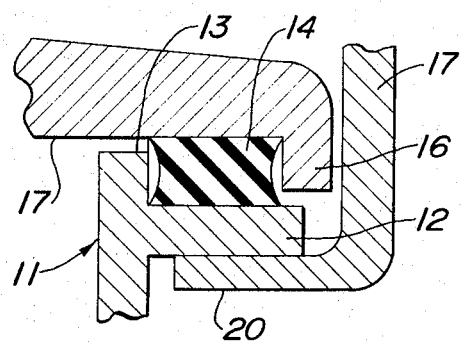
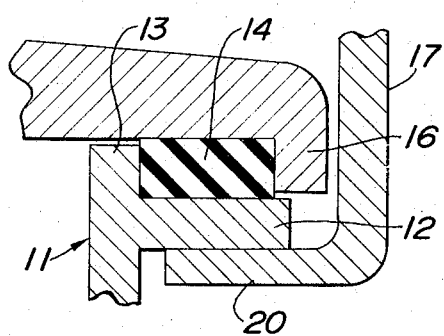
INVENTORS
DON K. WARSAW
CARL E. BRANDT

United States Patent Office 3,362,568
Patented Jan. 9, 1968

3,362,568
GASKET SEAL
Carl E. Brandt, 2142 Madison Ave. SE. 49507, and Don K. Warsaw, 2031 Wilshire Drive SE. 49506, both of Grand Rapids, Mich.
Filed Dec. 27, 1965, Ser. No. 516,320
2 Claims. (Cl. 220—46)

ABSTRACT OF THE DISCLOSURE

A compressible gasket in conjunction with an axially variable sealing space, the gasket having a concave edge to permit axial compression of the gasket without generating a pressure increase from lateral confinement.

This invention relates to the construction of gasket seals, and has been developed primarily as a seal for access ports in boilers. A sealing gasket is normally interposed between a cover and the collar defining the access port, and the cover is clamped against the sealing gasket to prevent leakage of the steam. In situations where a gasket is used to confine substantial pressure, it is common practice to provide the cover with a lip flange extending axially around the periphery so that the gasket is held radially against the effects of the pressure. To further confine the gasket, it is also common practice to provide that the gasket should surround a portion of the collar, usually resting against a radial flange set back from the end of the collar by an amount slightly less than the thickness of the gasket. The result of this arrangement is to closely define a space around the collar which is to be occupied substantially fully by the gasket as the cover clamp is tightened.

In the interest of obtaining as good a seal as possible, it is desirable that the gasket be compressible in a direction of reducing its thickness. This characteristic will permit the gasket to conform to minute irregularities in the cover and the supporting flange on the collar, and thus confine the pressure. It is obvious, however, that any compressibility in a direction to reduce the thickness of the gasket will produce an increase in the width of the gasket, both radially outward and inward. If the gasket is designed to substantially fill the space in which it is mounted, it is obvious that there is a definite limit to the thickness compressibility before the width expansion is stopped by contact with the surrounding fixed structure. At the point where the compression produces a width expansion sufficient to engage the edges of the gasket against the cover and the collar, further compression is practically impossible. The gasket material will then function as if it were under liquid pressure, as there is no place further for the material to go. This natural characteristic of gaskets limits the compressibility, using materials that are normally acceptable for resisting the conditions under which the gasket must function. Gaskets are not normally compressible in volume, as would be a piece of foam rubber. Such material would be totally incapable of resisting the pressures involved. Acceptable gasket material is resilient in the sense that a piece of solid rubber is capable of distortion, but of very little change in volume. Most gaskets are of the latter type of material, possibly with some fabric reinforcement.

The present invention provides an increased compressibility in thickness of acceptable gasket materials, and thus improves the seal without unduly increasing the required clamping forces. The edges of a gasket embodying this invention are formed in an initially concave configuration which permits considerable reduction in thickness without squeezing out the material of the gasket into solid engagement with the walls defining the barriers opposite the inner and outer edges. It must be noted that the friction at the top and bottom surfaces of the gasket is substantial enough so that a gasket cannot be considered to float laterally within the space it occupies. If it happens to be initially placed in a somewhat eccentric relationship, it will undoubtedly remain there as a result of this clamping friction. The result of this is that the edge surface most near to the solid surrounding structure will be limited in its expansion, and this will produce an immediate increase in the required clamping force to generate a given amount of reduction in thickness. Essentially these same considerations are present in practically any situation involving a gasket that is clamped in position by a cover, where the gasket is confined along at least one edge so that its edge-wise expansion in that area is limited.

The several features of the invention will be analyzed in detail through a discussion of the particular embodiment illustrated in the accompanying drawing. In the drawing:

FIGURE 1 is a sectional elevation showing a boiler access opening, with a cover clamped in position over a gasket.

FIGURE 2 is a perspective view of the gasket used in the assembly shown in FIGURE 1.

FIGURE 3 is an enlarged view on the plane 3—3 of FIGURE 2.

FIGURE 4 is a partial section showing the assembly in FIGURE 1 prior to the application of clamping force.

FIGURE 5 is a view corresponding to FIGURE 4, but illustrating the relationship with the components after the clamping force has been applied.

Referring to the drawing, the boiler 10 is shown provided with an access port defined by the collar 11. This collar has a radial flange 12 set back axially from the end 13 so that the collar can engage the central opening of the gasket 14. A cover 15 has peripheral lip flange 16 extending axially along the outer edge of the gasket 14, with the result that the flanges 12 and 16, together with the cover 15 and the collar 11 define a space substantially fully occupied by the gasket. A clamp 17 is essentially a pair of opposite arms extending from the central hub portion 18, and provided with lugs 19 and 20 which engage the underside of the flange 12 to oppose the forces generated by tightening the bolt 21. These forces bear against the central area of the cover 15, and are transferred to the flange 12 through the gasket 14, inducing a reduction in thickness to effect a complete seal.

The gasket 14 is constructed as best shown in FIGURES 2 and 3. The inner and outer edges 22 and 23 are formed in an axially concave configuration in the condition as initially installed, as shown in FIGURE 4. As clamping force is applied by tightening the bolt 21, the cover moves down toward the flange 12, compressing the gasket 14 so that the concave edges 22 and 23 assume a planar configuration, as shown in FIGURE 5. Compressibilty up to this point has taken place without generating substantial pressure between the edges 22 and 23 and the collar 11 or the flange 16.

The particular embodiments of the present invention which have been illustrated and discussed herein are for illustrative purposes only and are not to be considered as a limitation upon the scope of the appended claims. In these claims, it is our intent to claim the entire invention disclosed herein, except as we are limited by the prior art.

We claim:
1. In combination with a collar having a radial flange spaced axially from the end of said collar, a cover having a peripheral axial flange, said collar and cover normally defining an axially variable space surrounding said collar, and a clamp normally engaging said cover and said collar flange to clamp said cover in position, a gasket for occupying said space, said gasket being disposed between laterally-spaced surfaces on said collar and cover, respectively, said gasket being of compressible material and having an edge thereof initially axially concave whereby tightening of said clamp induces a reduction in thickness of said gasket without generating pressure against said edge.

2. A combination as defined in claim 1, wherein both the inner and outer edges of said gasket are axially concave.

References Cited

UNITED STATES PATENTS

| 1,362,878 | 12/1920 | Ladd | 220—55 |
| 1,800,085 | 4/1931 | Kroger et al. | 220—46 |
| 3,169,540 | 2/1965 | Moore et al. | 220—46 |

THERON E. CONDON, *Primary Examiner.*

JAMES B. MARBERT, *Examiner.*